No. 716,662. Patented Dec. 23, 1902.
B. J. BROWN.
COTTON SWEEP.
(Application filed Sept. 6, 1902.)
(No Model.)
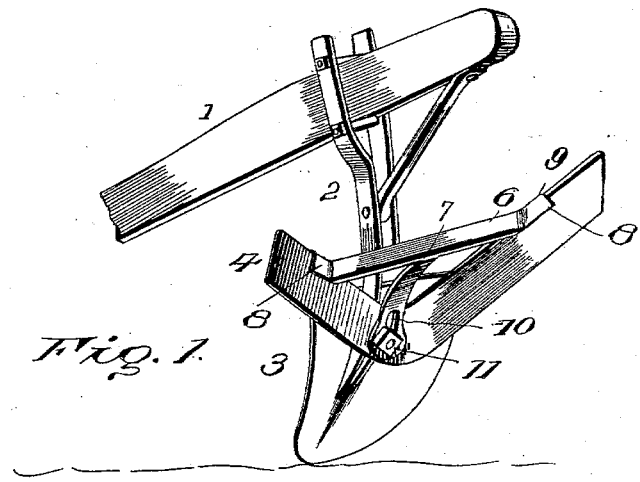
Fig. 1.
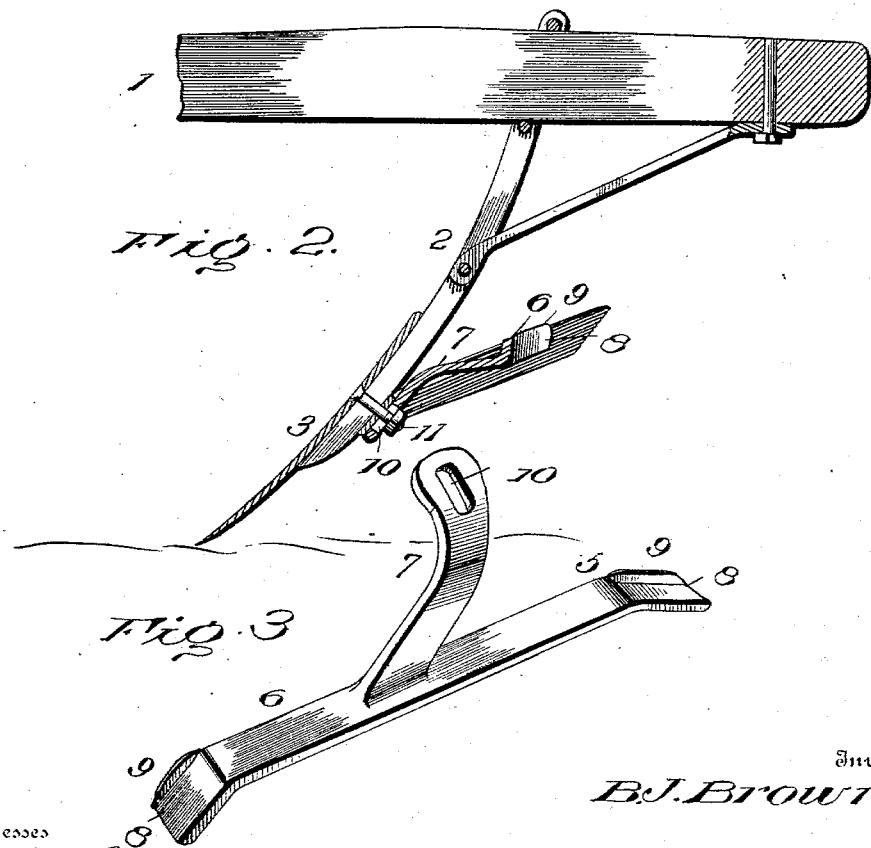
Fig. 2.
Fig. 3.
Witnesses
Gladys L. Thompson
Inventor
B. J. Brown
By
R. S. & A. B. Lacey, Attorneys

UNITED STATES PATENT OFFICE.

BUREL J. BROWN, OF STOUT, TEXAS.

COTTON-SWEEP.

SPECIFICATION forming part of Letters Patent No. 716,662, dated December 23, 1902.

Application filed September 6, 1902. Serial No. 122,416. (No model.)

*To all whom it may concern:*

Be it known that I, BUREL J. BROWN, a citizen of the United States, residing at Stout, in the county of Wood and State of Texas, have invented certain new and useful Improvements in Cotton-Sweeps, of which the following is a specification.

Plows and cultivators provided with a heel-sweep require frequent spreading and setting of the blades of the sweep, especially if the land be stiff, stony, and encumbered with roots and obstructions tending to press the blades of the sweep together.

This invention overcomes the aforementioned objection, since it provides a novel form of brace to be interposed between the blades of the sweep and the stock, said brace having three arms, two being diametrically disposed and adapted to engage with the blades and the third fitting in the angle formed between the said blades and secured to the stock by the heel-bolt.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a plow, showing the application of the invention. Fig. 2 is a central longitudinal section thereof. Fig. 3 is a detail perspective view of the brace.

Corresponding and like parts are referred to in the following description and indicated in all the views of the drawings by the same reference characters.

The implement shown may be a plow or cultivator and is illustrated to demonstrate the application of the invention and comprises a beam 1, stock 2, blade 3, and sweep 4, all of ordinary construction and arrangement.

The brace forming the essential feature of the invention comprises three arms 5, 6, and 7 and approximates the form of a T. Two of the arms 5 and 6 are in alinement and extend in opposite directions, and their outer ends are bent, as shown at 8, and provided with lips 9 to engage over the upper edges of the blades of the sweep, so as to prevent relative downward displacement of the brace and assist materially in holding it in place. The bent ends 8 of the arms 5 and 6 enable the brace to obtain an extended bearing against the blades of the sweep, thereby increasing the efficiency of the device. The arm 7 projects at a right angle from the arms 5 and 6 and curves in its length, so as to occupy a forward and downward curved position when the brace is applied. The lower end of the arm 7 is provided with a longitudinal slot 10 to receive the heel-bolt 11 and admit of the brace adapting itself to different makes and styles of sweeps. The brace when applied touches the sweep at three points, the arms 5 and 6 engaging with the blades of the sweep intermediate of their ends, and the arm 7 touching the sweep at the angle formed between the blades. The same fastening or bolt employed for securing the blade 3 to the stock 2 is utilized to retain the brace in place when properly positioned.

Having thus described the invention, what is claimed as new is—

In an agricultural implement provided with a sweep, an integral brace comprising three arms, two of the arms being in alinement and having their outer end portions angularly bent to obtain an extended bearing against the blades of the sweep, the said bent portions being provided with laterally-projecting lips at the upper edges thereof, a third arm extended from the alining arms about at a right angle and longitudinally curved at its outer end and provided with a longitudinal slot, substantially as described.

In testimony whereof I affix my signature in presence of two witnesses.

BUREL J. BROWN. [L. S.]

Witnesses:
R. L. WILMOTH,
J. D. RICHARDSON.